United States Patent
Jane Santamaria

(10) Patent No.: US 7,438,358 B2
(45) Date of Patent: Oct. 21, 2008

(54) INFANT CHAIR

(75) Inventor: Manuel Jane Santamaria, Palau De Plegamans (ES)

(73) Assignee: Jane, S.A., Barcelona (ES)

( * ) Notice: Subject to any disclaimer, the term of this patent is extended or adjusted under 35 U.S.C. 154(b) by 0 days.

(21) Appl. No.: 11/654,972

(22) Filed: Jan. 18, 2007

(65) Prior Publication Data

US 2007/0188002 A1    Aug. 16, 2007

(30) Foreign Application Priority Data

Jan. 31, 2006  (ES)  ............... 200600206 U

(51) Int. Cl.
*B60N 2/26* (2006.01)
(52) U.S. Cl. .................. 297/256.1
(58) Field of Classification Search ............ 297/256.1, 297/353, 250.1, 410, 61
See application file for complete search history.

(56) References Cited

U.S. PATENT DOCUMENTS

| 5,810,436 | A | 9/1998 | Surot | |
| 7,246,852 | B2 * | 7/2007 | Balensiefer | 297/250.1 |
| 2005/0242642 | A1 * | 11/2005 | Kespohl | 297/256.1 |

FOREIGN PATENT DOCUMENTS

| EP | 0 931 692 A1 | 7/1999 |
| EP | 1 000 571 A1 | 5/2000 |
| EP | 1 006 017 A2 | 6/2000 |
| ES | 2 237 052 | 7/2005 |
| FR | 2 841 755 | 1/2004 |

* cited by examiner

*Primary Examiner*—Milton Nelson, Jr.
(74) *Attorney, Agent, or Firm*—Merchant & Gould P.C.

(57) ABSTRACT

This infant chair comprises an independent seat (4) being related to a headrest (5) being fit to be positioned at different heights, the seat thus adopting different in-depth positions, the lifting of the headrest to a higher position bringing about a bigger depth for the seat's position. The seat is formed by an assembly of two plates (6 and 7) being transversally linked to each other in a pin-jointed connection, said assembly being linked in a pin-jointed connection to a lower support (9) being in its turn linked in a pin-jointed connection to a third plate (11), this latter being the one that is related to the headrest (5).

The headrest (5) is on its rear surface provided with a locking member (12) being adapted to be selectively fitted into different pockets (13) being vertically aligned in the backrest (14) of the chair, said locking member being related to a control (15) being arranged on the rear surface of the backrest (14), said locking member being fit to be unlocked by means of said control in order to thus position the headrest (5) at different heights.

3 Claims, 2 Drawing Sheets

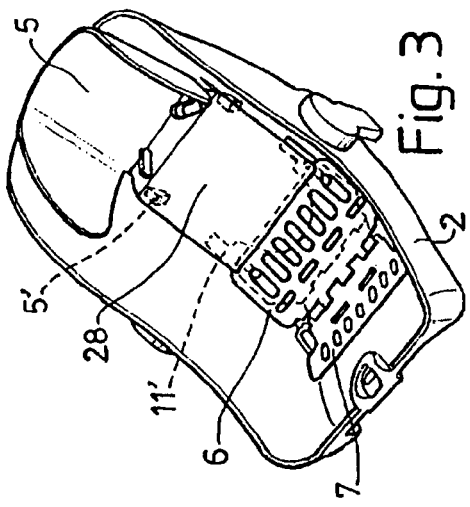
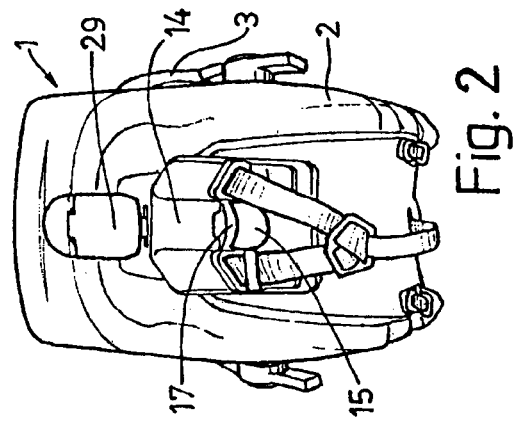
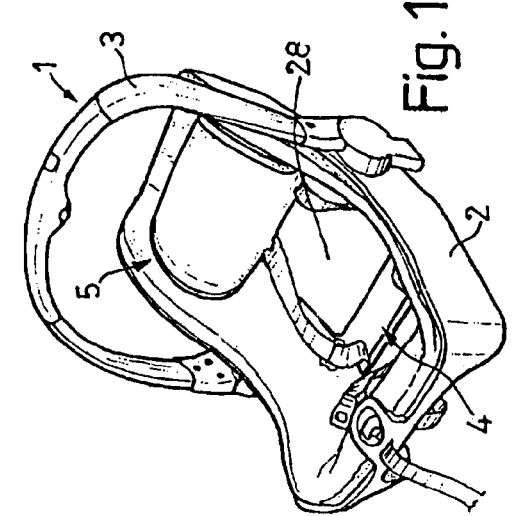
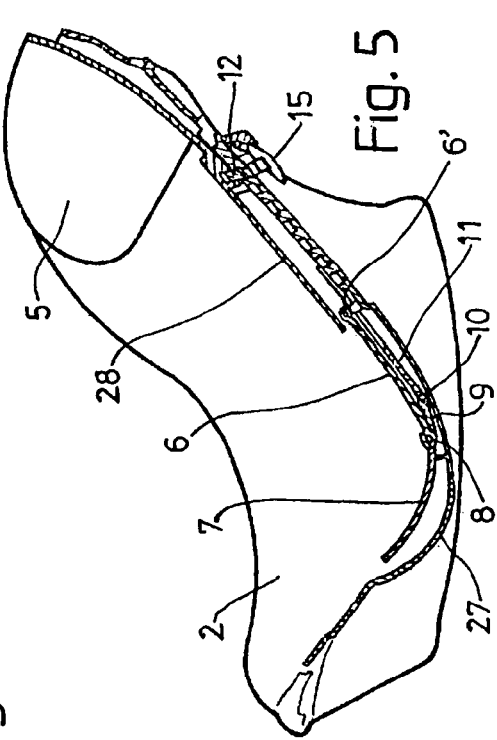
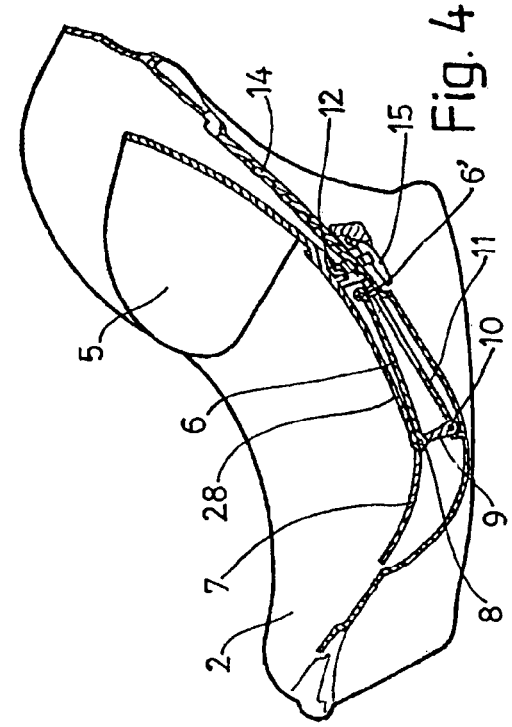

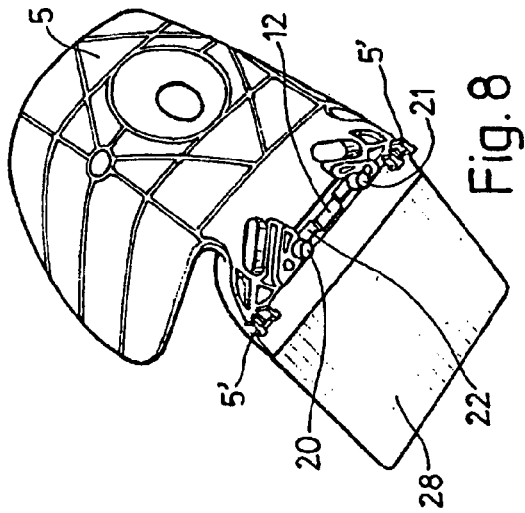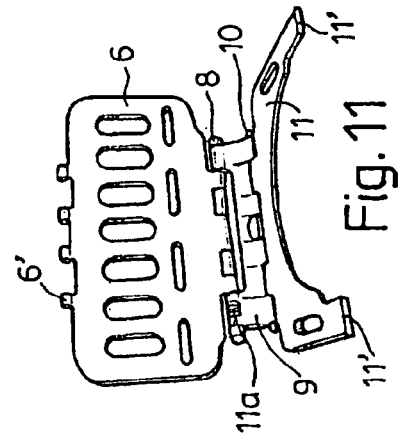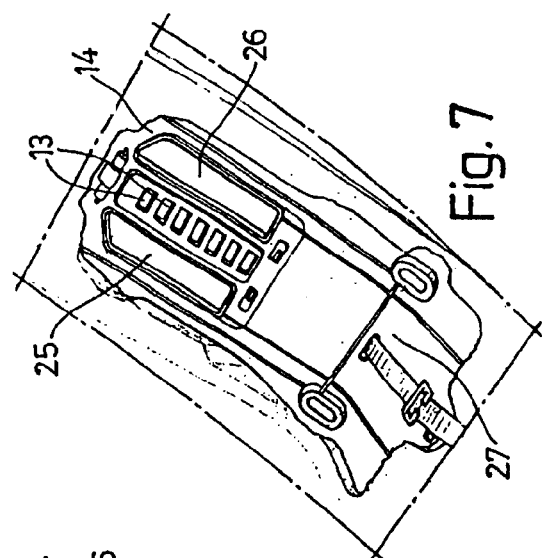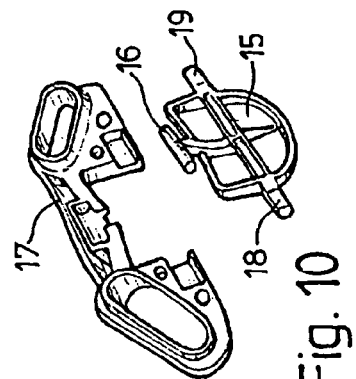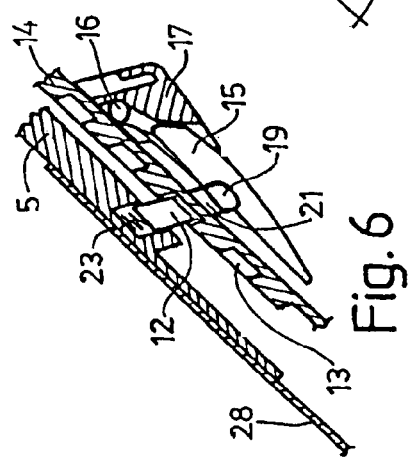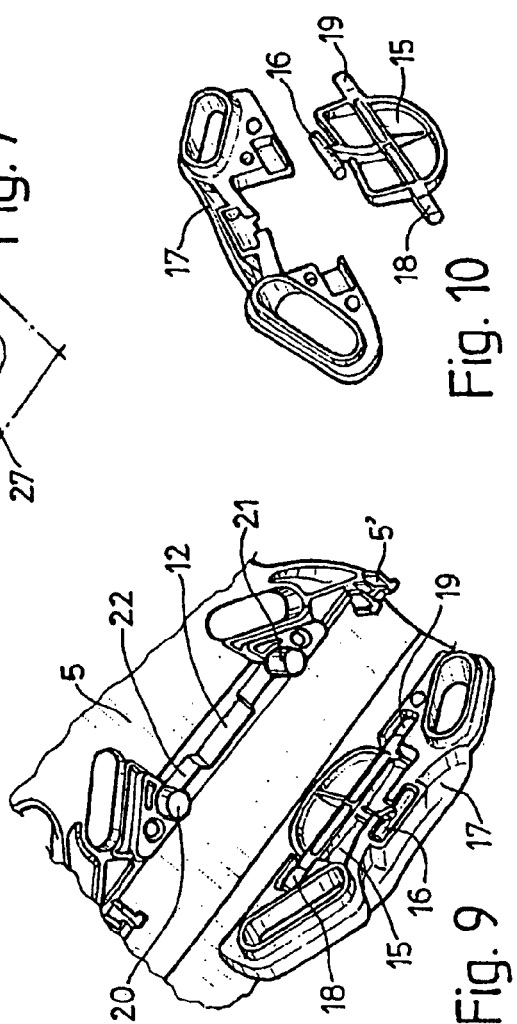

INFANT CHAIR

FIELD OF THE INVENTION

This infant chair can be made as per different versions such as forming a one-piece body having a grab handle and being adapted to be fitted to a push chair, or else forming a body consisting of a seat and backrest and being designed for being fixed on the seat of a motorcar.

BACKGROUND OF THE INVENTION

There are different models of infant chairs with different structures and different means both for their fitting to a push chair and for their fastening to the motorcar seats, some of these chairs comprising fixed headrests whereas others have a height-adjustable headrest.

SUMMARY OF THE INVENTION

This invention has as its object and infant chair whose seat and headrest are fit to have their position adapted to the child's size in such a way that as the child grows up the headrest is shifted to a higher position thus giving a bigger depth to the seat, it being achieved in this way that when the child is very small the seat has a small depth and when the child has already grown to a bigger size said seat then has a bigger depth, the headrest then logically being located in a higher position.

A characterizing feature of this infant chair lies in the fact that when shifting the headrest towards higher positions the depth of the seat is automatically increased in a progressive way, the seat being for such a purpose related to the headrest.

The seat is formed by an assembly of two plates being transversally linked to each other in a pin jointed connection, said assembly being linked in a pin-jointed connection to a lower support being in its turn linked in a pin-jointed connection to a third plate, this latter being the one that is related to the headrest.

On its rear surface the headrest is provided with a locking member being adapted to be fitted into different pockets being vertically aligned in the backrest of the chair, said locking member being related to a control being arranged on the rear surface of the backrest, said locking member being fit to be unlocked by means of said control in order to thus position the headrest at different heights.

These and other characterizing features will be best made apparent by the following detailed description whose understanding will be made easier by the accompanying two sheets of drawings showing a practical embodiment being cited only by way of example not limiting the scope of the present invention.

DESCRIPTION OF THE DRAWINGS

In the drawings:

FIGS. 1 and 2 illustrate the infant chair as seen in a perspective view and from the back, respectively;

FIG. 3 is a perspective view of the infant chair showing the make-up of the seat and of the headrest;

FIGS. 4 and 5 diagrammatically depict in a longitudinal section the infant chair with the seat and the headrest in the position for children of short age and for older children, respectively;

FIG. 6 diagrammatically shows in a sectional elevation the detail of the headrest locking means;

FIG. 7 shows in a perspective view the backrest of the infant chair and its lower extension making up the base upon which the seat comes to rest;

FIG. 8 represents the headrest as seen in a perspective view from the back;

FIG. 9 is a perspective view showing in detail the rear side of the backrest with the locking member and the unlocking control being arranged in a separate arrangement;

FIG. 10 shows in a perspective view the unlocking control having been separated from its support; and FIG. 11 depicts in a perspective view the make-up of the seat as seen from below.

DETAILED DESCRIPTION

According to the drawings the infant chair (1) being depicted by them is of the type comprising a one-piece body (2) being provided with a handle (3) allowing to manually transport it, said one-piece body being adapted to be fitted to a baby carriage.

This infant chair characteristically has an independent seat (4) being related to a headrest (5), the seat being formed by the assembly of two plates (6) and (7) being transversally linked to each other in a pin-jointed connection by means of a pin (8) at which a lower support (9) is as well linked in a pin-jointed connection (FIGS. 4, 5 and 11 (in this FIG. (11) the plate (6) hides the plate (7)), said lower support being pin-jointedly linked by means of a pin (10) to a third plate (11) being related to the headrest (5), the seat assembly comprising resilient means being made up by a spring (11a) being fitted on the pin (8) and through the support (9) biasing the third plate (11) towards the headrest (5).

The plate (6) is at its rear edge (6') transversally linked in a pin-jointed connection to the body (2).

The headrest (5) is on its rear surface provided with a locking member (12) (FIGS. 8 and 9) being adapted to be selectively fitted into different pockets (13) being vertically aligned in the backrest (14) of the chair (FIG. 7), said locking member being related to a control (15) (FIG. 10) being arranged on the rear surface of the backrest (14).

Said control (15) has a pin-shaped appendage (16) by whose means it is linked in a pin-jointed connection to a support (17) and comprises two end appendages (18) and (19) being arranged in a mutually opposite arrangement and being fit to act against respective noses (20) and (21) of the piece (22) forming the locking member (12), this piece being fitted with resilient means being made up by springs (23) being arranged in coincidence with the noses (20) and (21) and thus biasing the locking member (12) towards its active position when fitted into one of the pockets (13).

The support (17) is fixedly attached to the headrest (5) through the openings (25) and (26) being provided in the backrest (14) (FIG. 7), this latter inferiorly extending into the base (27) upon which the seat (4) comes to rest, the headrest (5) being integrally provided with a lower sheet member (28), this latter with the headrest in the lifted position covering the lower half of the backrest and with the headrest in the lowered position covering the plate (6) of the seat.

Reference numeral (29) designates a hinged small cover being designed to in its lowered position protect the control (15).

In FIG. 4 the chair is arranged for children of short age, the seat for such a purpose having a small depth, said position being maintained by the abutting contact of the third plate (11) against the headrest (5) finding itself in the lowered position, i.e. by the abutment of the ends (11') of said plate on the stops (5') of the headrest.

As the headrest (5) is lifted while for such a purpose being unlocked with the control (15), due to the biasing action of the spring (11a) the third plate (11) is also shifted upwards because of the pushing action of the support (9), the seat hence progressively acquiring a bigger depth till reaching the maximum (FIG. 5) where it then rests on the base (27), the headrest (5) in this latter arrangement finding itself in a lifted position, all this in these conditions allowing to properly accommodate children of older age. That is to say that as the child grows up the headrest is progressively shifted to higher positions and the seat thus progressively acquires a bigger depth.

This infant chair will logically have the corresponding safety belts and the necessary accessories, as well as the final upholstery.

The invention claimed is:

1. An infant chair comprising a seat and a headrest positionable at different heights, and the seat being movable to different depth positions, the lifting of the headrest to a higher position bringing about a bigger depth for the seat's position, wherein the headrest is on its rear surface provided with a locking member being selectively fitted into different pockets being vertically aligned in a backrest of the chair, said locking member being related to a control being arranged on the rear surface of the backrest, said locking member being unlocked by said control in order to position the headrest at different heights, and wherein the control is linked in a pin-jointed connection to a support being fixedly attached to the headrest, said control having two end appendages being arranged in a mutually opposite arrangement and being fit to act against respective noses being provided at the ends of the piece forming the locking member, this piece being fitted with resilient means biasing the locking member towards its active position.

2. An infant chair, comprising a seat and a headrest positionable at different heights, and the seat being movable to different depth positions, the lifting of the headrest to a higher position bringing about a bigger depth for the seat's position, wherein the seat is formed by an assembly of two plates transversally linked to each other in a pin-jointed connection, said assembly being linked in a pin-jointed connection to a lower support, wherein the lower support is linked in a pin-jointed connection to a third plate, wherein the third plate is related to the headrest.

3. The infant chair as per claim 2, wherein the seat comprises resilient means through the lower support, biasing the third plate towards the headrest.

* * * * *